United States Patent [19]

Sato et al.

[11] Patent Number: 5,333,174
[45] Date of Patent: Jul. 26, 1994

[54] COMMUNICATION SYSTEM USING MOVABLE RADIO TERMINALS

[75] Inventors: Risaburo Sato; Zenichiro Nagasawa, both of Sendai, Japan

[73] Assignee: Small Power Communications Systems Research Laboratories Co., Ltd., Sendai, Japan

[21] Appl. No.: 670,010

[22] Filed: Mar. 15, 1991

[30] Foreign Application Priority Data

Mar. 30, 1990 [JP] Japan .................................. 2-81370

[51] Int. Cl.$^5$ ...................... H04M 11/00; H04Q 7/00
[52] U.S. Cl. ....................................... 379/58; 379/63; 379/144; 379/155; 455/33.1
[58] Field of Search ................. 379/56, 58, 63, 144, 379/155; 455/31, 33.1; 370/50, 109

[56] References Cited

U.S. PATENT DOCUMENTS

| | | | |
|---|---|---|---|
| 4,300,161 | 11/1981 | Haskell | 370/109 |
| 4,593,318 | 6/1986 | Eng et al. | 370/109 |
| 4,748,655 | 5/1988 | Thrower et al. | 379/58 |
| 4,777,646 | 10/1988 | Harris | 379/144 X |
| 4,798,655 | 5/1988 | Thrower et al. | 379/58 X |
| 4,829,561 | 5/1989 | Matheny | 379/58 |
| 4,856,046 | 8/1989 | Streck et al. | 375/56 |
| 4,879,740 | 11/1989 | Nagashima et al. | 379/60 |
| 4,955,050 | 9/1990 | Yamauchi | 455/33.1 |
| 5,020,094 | 5/1991 | Rash et al. | 379/61 |
| 5,040,205 | 8/1991 | Kunihiro | 379/63 |

OTHER PUBLICATIONS

Patent Abstracts of Japan, vol. 13, No. 503(E-844), Nov. 13, 1989, & JP-A-1-200836, Feb. 5, 1988, S. Kojima, "Private Branch Radio Telephone System".

Primary Examiner—Stephen Chin
Assistant Examiner—Paul Loomis
Attorney, Agent, or Firm—Oblon, Spivak, McClelland, Maier & Neustadt

[57] ABSTRACT

A system according to the present invention comprises a telephone switchboard 20 and first coupling distributors 17–19, which are arranged in a central telephone exchange 13, second coupling distributors 10–12 arranged in areas provided with public telephones 1–3, and connected to the first coupling distributors through transmission path 14–16, movable radio terminals 21–26, and base stations 4–6, connected to the second coupling distributors, for relaying radio signals between the radio terminals and the central station. The transmission path 14–16 are used for transmitting signals between the base stations and the central station, as well as between the public telephones and the telephone switchboard.

3 Claims, 2 Drawing Sheets

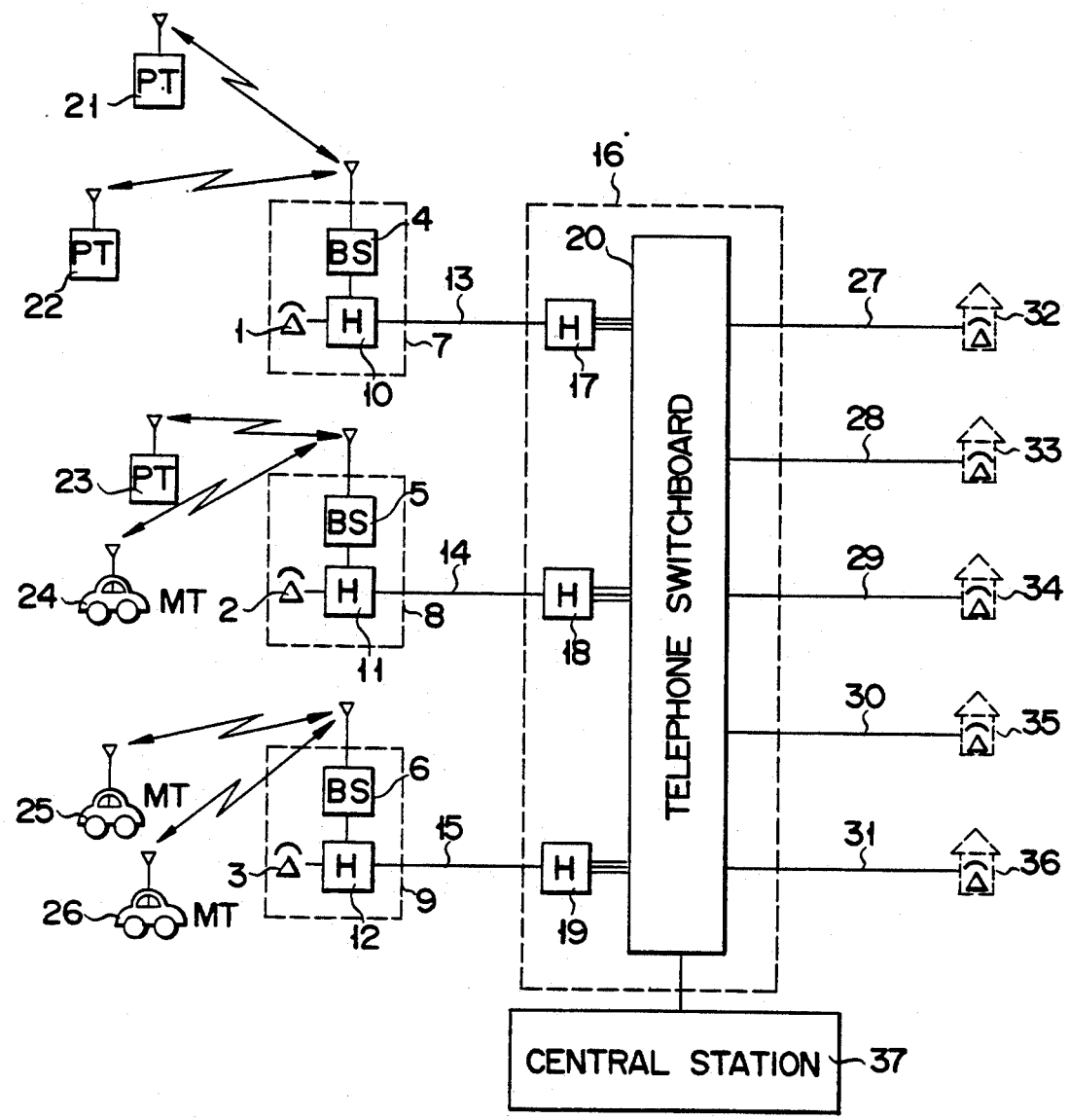
F I G. 1

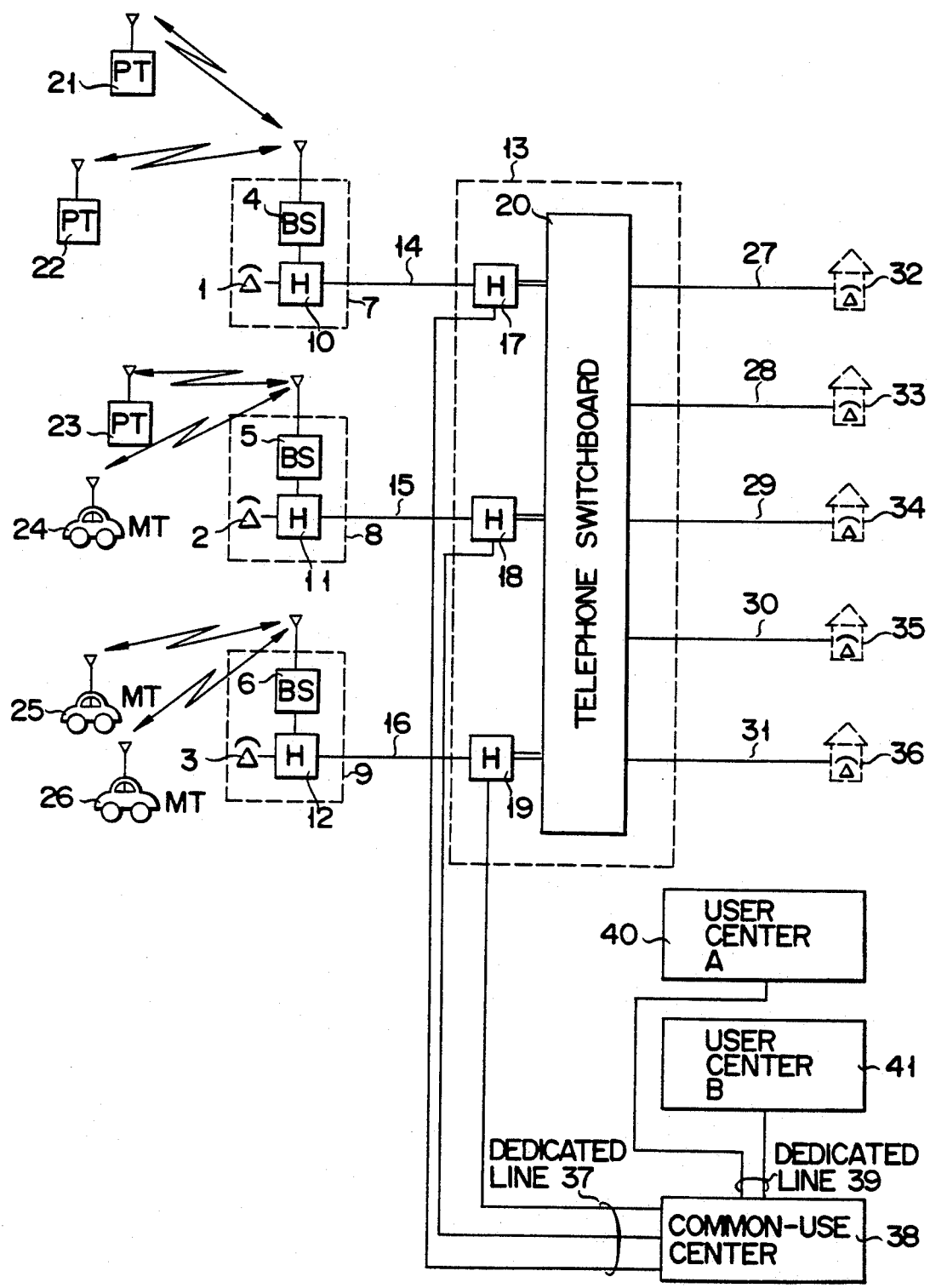
F I G. 2

COMMUNICATION SYSTEM USING MOVABLE RADIO TERMINALS

BACKGROUND OF THE INVENTION

1. Field of the Invention

This invention relates to a movable communication system having an improved transmission path connecting a communication center to base stations for relaying voice and data between the center and a movable radio terminal such as a radio telephone installed in a vehicle.

2. Description of the Related Art

There are various kinds of movable radio terminals or signposts such as a mobile telephone, a portable telephone, and a convenience radiophone, which are used for communication in a small area. These terminals require assistance of a base station for relaying signals.

To use the terminals, base stations must be set at desired locations, and dedicated transmission lines must be provided, connecting the base stations to a communication center. Without transmission lines and land spaces for installing the base stations, the movable radio terminals cannot be used.

SUMMARY OF THE INVENTION

It is the object of the present invention to provide a communication system having portable radio terminals (including those installed in vehicles, ships, airplanes and the like), and using telephone lines.

To attain the above object, the system of the invention comprises movable radio terminals, a central station, and a base station, connected to the central station through a transmission line, for relaying signals between the central station and respective movable terminals, the transmission line being used for transmitting signals between the base station and central station, as well as between the central telephone exchange and a public telephone.

According to the present invention, the base station is located in a telephone box, and a transmission path for the base station is used also for a telephone arranged in the telephone box, whereby more than one person can communicate simultaneously by using the telephone or portable radio terminal.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing a movable communication system according to a first embodiment of the invention; and FIG. 2 is a diagram showing a movable communication system according to a second embodiment of the invention.

DETAILED DESCRIPTION OF THE PREFERRED EMBODIMENTS

FIG. 1 shows a movable communication system according to a first embodiment of the present invention. In the figure, the public telephones 1-3 and base stations 4-6 are housed in the telephone boxes 7-9, respectively. The base stations (BS) 4-6 relay signals between a central station, hereinafter referred to, and respective movable radio terminals such as a mobile telephone, a convenience radiophone, a portable telephone, a telepoint, a cordless telephone, a pocket bell, a teleterminal, and an AVM (Automatic Vehicle Monitoring) system. The telephone boxes 7-9 located on streets or so.

The telephone boxes 7-9 further house coupling distributors (H) 10-12 for distributing respective cables to the base stations 4-6 or to the public telephones 1-3.

The coupling distributors (H) 10-12 are connected to coupling distributors (H) 17-19 provided in a central telephone exchange 16 through cables 13-15, and can be connected to a telephone switchboard 20 by the coupling distributors (H) 17-19.

Radio communication is performed between the base stations 4-6, on one hand, and portable radio terminals (PT) 21-23 (such as a portable telephone, a cordless telephone, a pocket bell, and a teleterminal) or mobile terminals (MT) 24-26 (such as a mobile telephone, a convenience radiophone, and an AVM system), on the other hand.

The telephone switchboard 20 provided in the central telephone exchange 16 is connected to home telephones (T) 32-36 through transmission lines (L) 27-31, respectively.

The operation of the above-described communication system having movable terminals will now be explained.

When communication such as conversation or facsimile data transmission is performed between the portable radio terminal 23 and home telephone 32, the following transmission route is used: portable radio terminal 23—base station 5—coupling distributor 11—cable 14—coupling distributor 18—telephone switchboard 20—transmission line 27—home telephone 32.

Similarly, when communication is performed between the mobile terminal 24 and home telephone 34, the transmission route is: mobile terminal 24—base station 5—coupling distributor 11—cable 14—coupling distributor 18—telephone switchboard 20—cable 29—home telephone 34.

Further, when communication is performed between the public telephones 2 and 36, the transmission route is: public telephone 2—coupling distributor 11—cable 14—coupling distributor 18—telephone switchboard 20—cable 31—home telephone 36.

As is described above, some telephones and terminals use the same route of coupling distributor 11—cable 14—coupling distributor 18—telephone switchboard 20.

To transmit signals (indicative of data) of three kinds through the same route, without causing interference between the signals, a system such as time compression multiplexing transmission system, hybrid system, or frequency division multiplexing transmission system is employed.

FIG. 2 shows a second embodiment. This embodiment is different from the first embodiment in that it additionally employs a communication network comprising a common-use center 38 connected to coupling distributors (H) 17-19 through dedicated lines 37, and user centers (A and B) 40 and 41 connected to the common-use center 38 through dedicated lines 39. This network enables communication between, for example, movable terminals (such as trucks and taxies for business use), on one hand, and their firms (user centers 40 and 41), on the other hand.

As is described in detail above, the communication system of the present invention places the base stations (BS) in telephone boxes (7-9) located in many places. Thus, the base stations do not require places dedicated to themselves.

Further, since the cable 13-15 between the telephone switchboard 20 and base stations are telephone lines, but not lines dedicated to the base stations, the number of the base stations can be increased easily. Accordingly, a system including various movable terminals and telephones can be easily constructed.

In addition to the above, since telephone boxes are located everywhere, even a small-output portable radio terminal can perform communication. The radio terminal can easily be made to have, for example, a wrist-watch size, and to be multifunctional.

If the watch-size radio terminal is carried by a person, the following advantages are available:

First, communication such as conversation or data transmission can be performed at any time between the radio terminal and telephone, irrespective of the location (indoor, outdoor, land, sea, or sky) of the personal having the terminal. Further, persons who communicate between the radio terminal and telephone can confirm their safety with each other.

Second, when telephone calls are concentrated in a certain small zone, for example, in case of emergency such as a natural disaster, transient concentration of calls can easily be prevented by restricting the number of radio terminals used or determining the priority order of calls by the common-use center 38.

Third, the small output radio terminal can be used as a sign post for an AVM system which detects the position of the terminal, or used in public traffic means such as a bus or taxi.

A system linking the second embodiment with the above-described AVM system can also be constructed. According to this system, the position of a moving terminal (mobile terminal or portable radio terminal) can be detected and recorded by the AVM system, and the terminal can easily be called by way of the user center employed in the second embodiment.

As is described above, in the system of the invention, the base stations for various movable terminals are located in existing telephone boxes, and the transmission lines provided between telephones housed in the boxes and the central telephone exchange are used also for transmitting signals between the base stations and central telephone exchange, thereby enabling the spaces required for the base stations to obtain with ease and accordingly enabling the number of devices contained in the base stations to increase.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A communication system, comprising:
   a public telephone;
   a central telephone exchange connected to said public telephone through a telephone line;
   mobile terminals;
   a base station, established in an area proximate to said public telephone, for receiving and transmitting radio signals from and to said mobile terminals and for converting said received radio signals from said mobile terminals to signals to be transmitted over said telephone line to said central telephone exchange and for converting signals transmitted over said telephone line by said central telephone exchange to said base station into said transmitted radios signals;
   wherein a telephone switchboard is arranged in said central telephone exchange, and the communion system further comprises:
   a first coupling distributor, arranged in said central telephone exchange and connected to said telephone switchboard, for distributing a transmission path of said telephone line to at least one of the base station and said public telephone;
   at least one telephone area provided with said public telephone; and
   a second coupling distributor having two ends and arranged in said telephone area, one end connected to said public telephone and another end connected to said base station;
   said transmission path of said telephone line being used for transmitting voice and data signals between said base station and said telephone switchboard, as well as between said public telephone and said telephone switchboard.

2. The communication system according to claim 1, further comprising:
   at least one common-use center connected to a first coupling distributor through a first dedicated line; and
   at least one user center connected to said at least one common-use center through a second dedicated line;
   and wherein said mobile terminals are registered in said common-use center, and different kinds of signals indicative of voice and data are simultaneously transmitted between said movable radio terminals and said at least one user center.

3. The communication system according to claim 2, wherein when a plurality of calls are made during a same period by said mobile terminals, said at least one common-use center restricts a number of said movable radio terminals able to communicate with said at least one user center, and determines a priority order of the calls.

* * * * *